US009575922B2

(12) United States Patent
Desimone et al.

(10) Patent No.: US 9,575,922 B2
(45) Date of Patent: Feb. 21, 2017

(54) APPARATUS, SYSTEM, AND METHOD FOR IMPROVING EQUALIZATION WITH A SOFTWARE EQUALIZATION ALGORITHM

(71) Applicants: Nathaniel L Desimone, Portland, OR (US); Theodore Z Schoenborn, Portland, OR (US); Earl Wight, Aloha, OR (US); Duane Heller, Portland, OR (US); Maria F Pineda, Portland, OR (US)

(72) Inventors: Nathaniel L Desimone, Portland, OR (US); Theodore Z Schoenborn, Portland, OR (US); Earl Wight, Aloha, OR (US); Duane Heller, Portland, OR (US); Maria F Pineda, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 8 days.

(21) Appl. No.: 14/039,469

(22) Filed: Sep. 27, 2013

(65) Prior Publication Data

US 2015/0092828 A1 Apr. 2, 2015

(51) Int. Cl.
*H04B 3/46* (2015.01)
*G06F 13/42* (2006.01)
*H04L 25/03* (2006.01)
*H04L 25/14* (2006.01)

(52) U.S. Cl.
CPC ..... *G06F 13/4221* (2013.01); *H04L 25/03885* (2013.01); *H04L 25/14* (2013.01)

(58) Field of Classification Search
CPC .......... H04L 25/03343; H04L 25/03057; H04L 25/03885; H04L 27/01; H04L 25/0307; H04L 1/205; H04L 25/03878; H04L 2025/03808; H04L 25/0272; H04L 25/063; H04L 27/2626; H04L 27/2647; H04L 27/0002; H04L 65/1069; H04L 25/0264; H04L 2025/03426
USPC ....... 375/229, 219, 231, 260, 371, 224, 226, 375/227; 370/516, 229, 219, 231, 260, 370/371, 224, 226, 227; 455/73, 306, 455/253.2; 708/323; 379/406.1, 406.8
See application file for complete search history.

(56) References Cited

U.S. PATENT DOCUMENTS

| | | | | |
|---|---|---|---|---|
| 5,598,130 | A * | 1/1997 | Mesuda et al. | 332/119 |
| 8,228,972 | B2 * | 7/2012 | Tonietto | H04L 1/205 375/219 |
| 2003/0126281 | A1 * | 7/2003 | Harriman | 709/236 |
| 2005/0286567 | A1 * | 12/2005 | Cherukuri et al. | 370/507 |
| 2006/0227918 | A1 * | 10/2006 | Kolbehdari | 375/371 |
| 2006/0294285 | A1 * | 12/2006 | Ahern | 710/305 |
| 2008/0031277 | A1 * | 2/2008 | Walter et al. | 370/469 |
| 2008/0222594 | A1 * | 9/2008 | Maniloff et al. | 716/16 |
| 2013/0202016 | A1 * | 8/2013 | Mohajeri et al. | 375/219 |
| 2014/0092952 | A1 * | 4/2014 | Aguilar-Arreola | H04L 27/01 375/233 |
| 2014/0269694 | A1 * | 9/2014 | Flynn et al. | 370/389 |

* cited by examiner

*Primary Examiner* — Rahel Guarino
(74) *Attorney, Agent, or Firm* — The Law Office of Herbert T. Patty, P.C.

(57) ABSTRACT

A system and method consistent with the present disclosure includes determining a jitter tolerance of a particular lane of a communication link corresponding to each of a plurality of equalization coefficients. Further, determining a particular equalization coefficient of the plurality of equalization coefficients that provides a maximum jitter tolerance. Next, using the particular equalization coefficient for the particular lane of the communication link during operation based on determining the particular equalization coefficient which provides the maximum jitter tolerance.

28 Claims, 14 Drawing Sheets

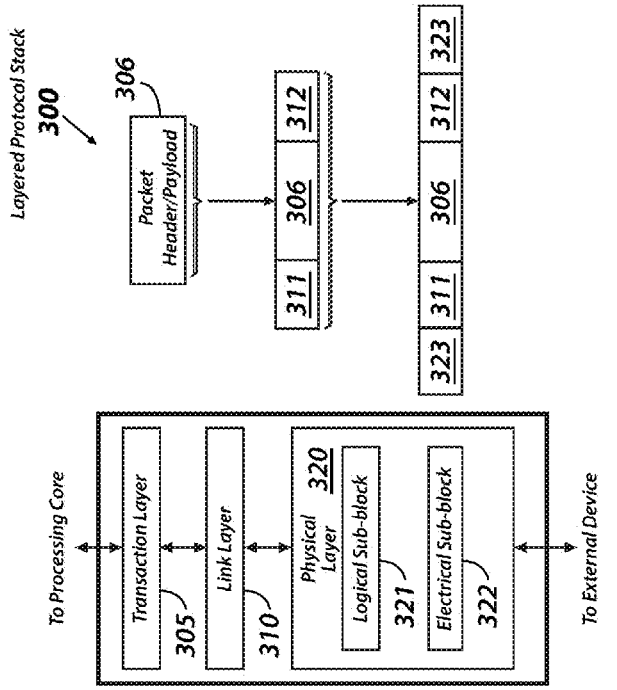
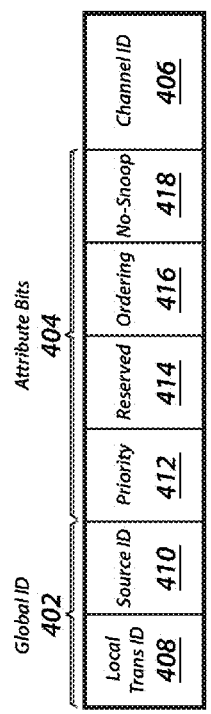

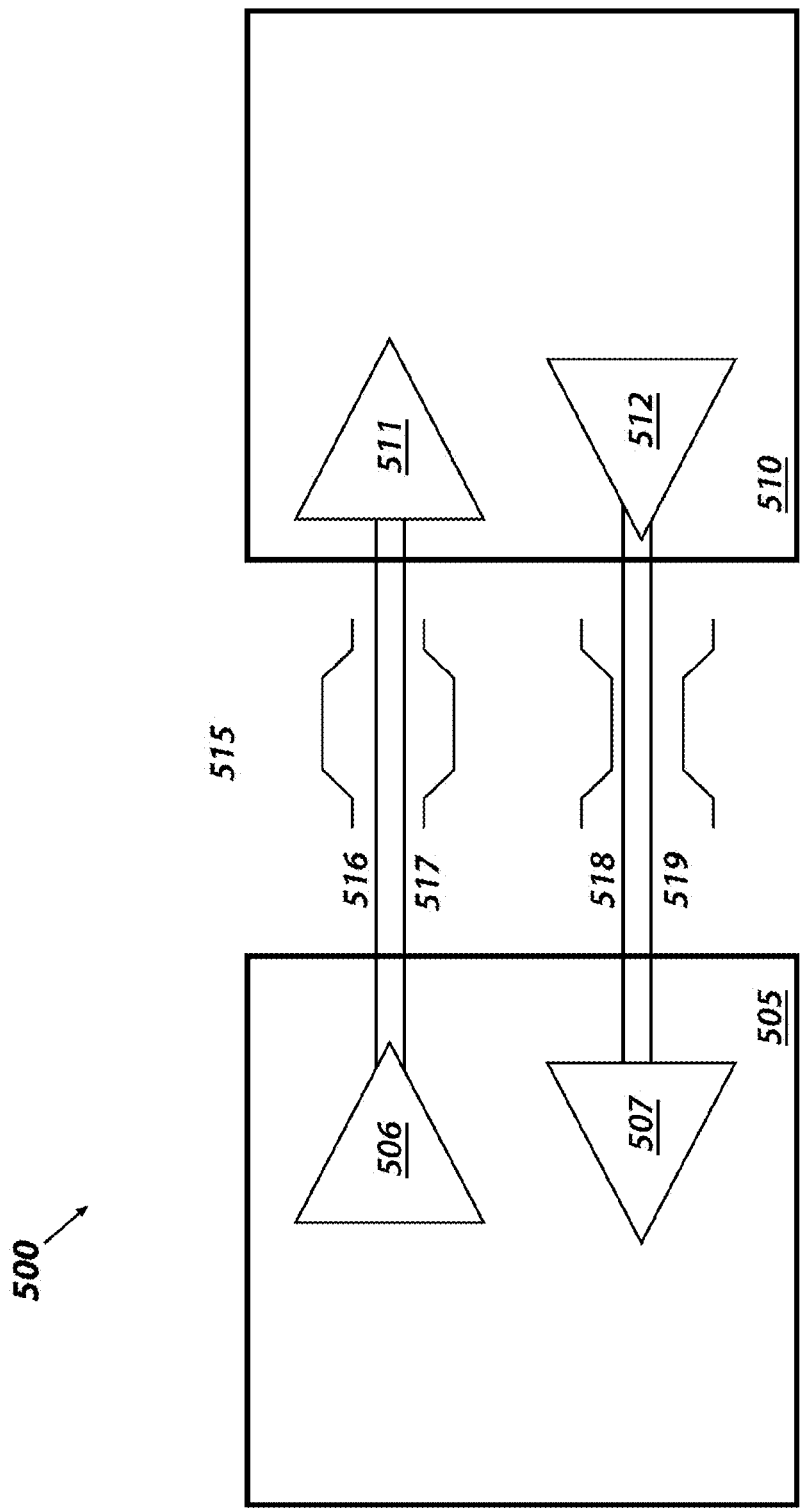

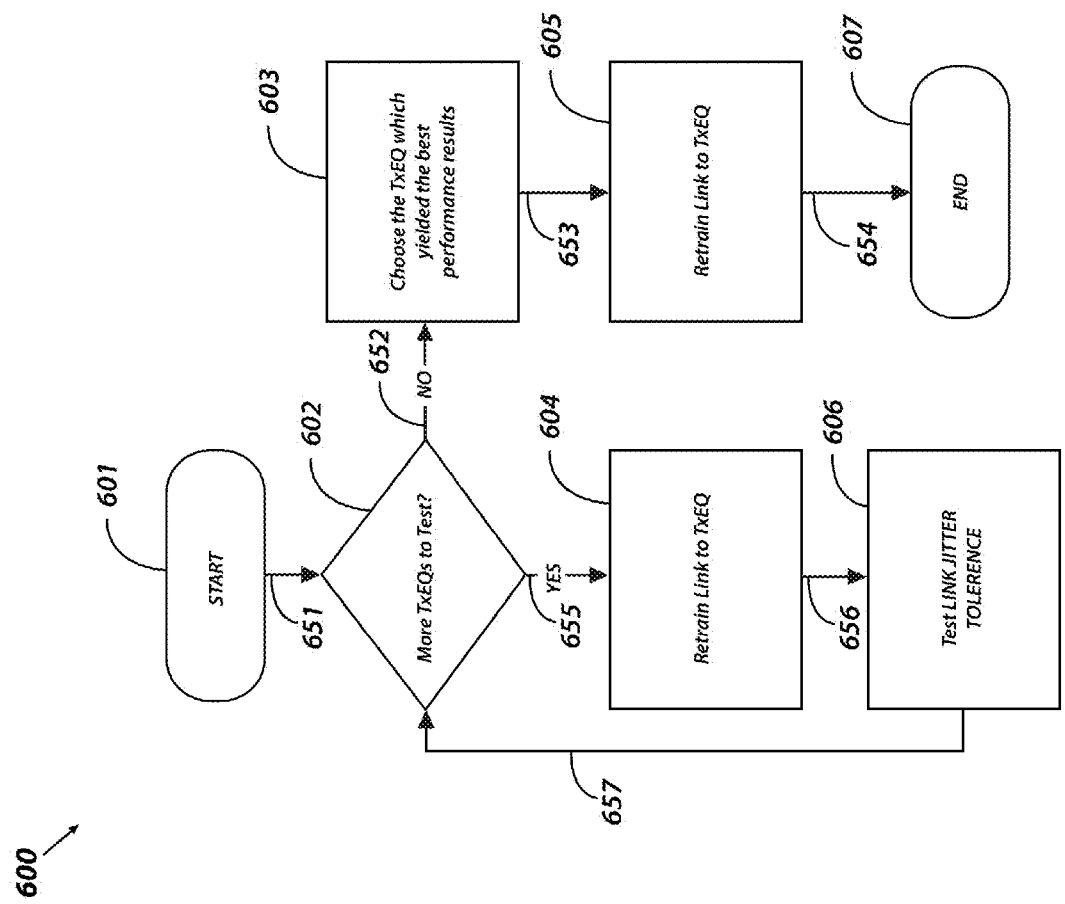

APPARATUS, SYSTEM, AND METHOD FOR IMPROVING EQUALIZATION WITH A SOFTWARE EQUALIZATION ALGORITHM

FIELD

This disclosure pertains to computing systems, and in particular (but not exclusively) to techniques for maximizing performance of a communication link.

BRIEF DESCRIPTION OF THE DRAWINGS

FIG. 3 is a diagram illustrating an embodiment of a PCIe compliant interconnect architecture including a layered stack.

FIG. 4 is a diagram illustrating an embodiment of a PCIe compliant request or packet to be generated or received within an interconnect architecture.

FIG. 5 is a diagram illustrating an embodiment of a serial point to point fabric.

FIG. 6 is a diagram illustrating an algorithm loop for performing a link health experiment.

DETAILED DESCRIPTION

Figure 1:
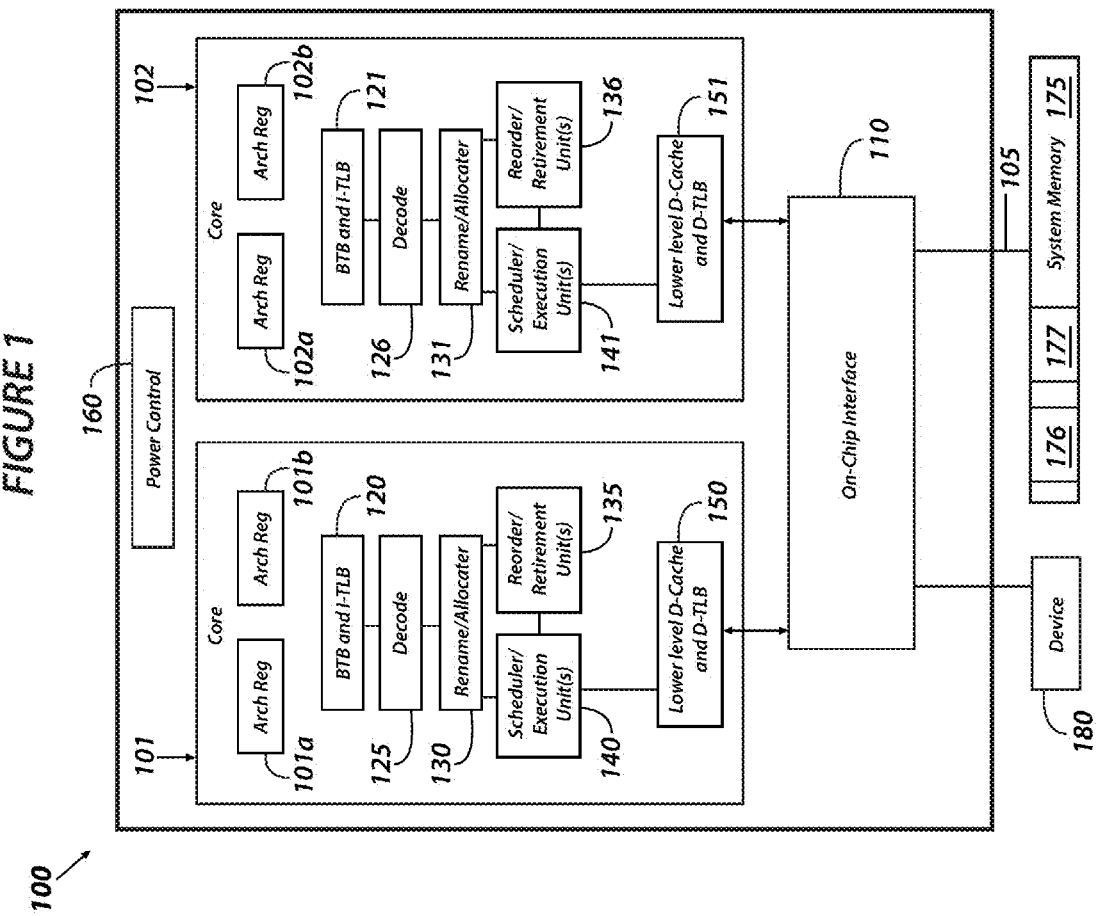
FIG. 1 is a diagram illustrating an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etcetera in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement units 135, 136, ILTB 120, load/store buffers, and queues may be shared through partitioning. Other resources, such as general purpose internal registers, page-table base register(s), low-level data-cache and data-TLB 115, execution unit(s) 140, 141, and portions of out-of-order unit 135, 136 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer blocks 130, 131 include an allocator to reserve resources, such as register files to store instruction processing results. However, threads 101a and 101b are potentially capable of out-of-order execution, where allocator and renamer blocks 130, 131 also reserve other resources, such as reorder buffers to track instruction results. Units 130, 131 may also include a register renamer to rename program/instruction reference registers to other registers internal to processor 100. Reorder/retirement units 135, 136 include components, such as the reorder buffers mentioned above, load buffers, and store buffers, to support out-of-order execution and later in-order retirement of instructions executed out-of-order.

Scheduler and execution unit(s) blocks 140, 141, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffers (D-TLB) 150, 151z are coupled to execution unit(s) 140, 141. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etcetera in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/ Hot-Swap support, Data Integrity, and Error Handling are among some of the advanced features supported by PCI Express.

Figure 2:
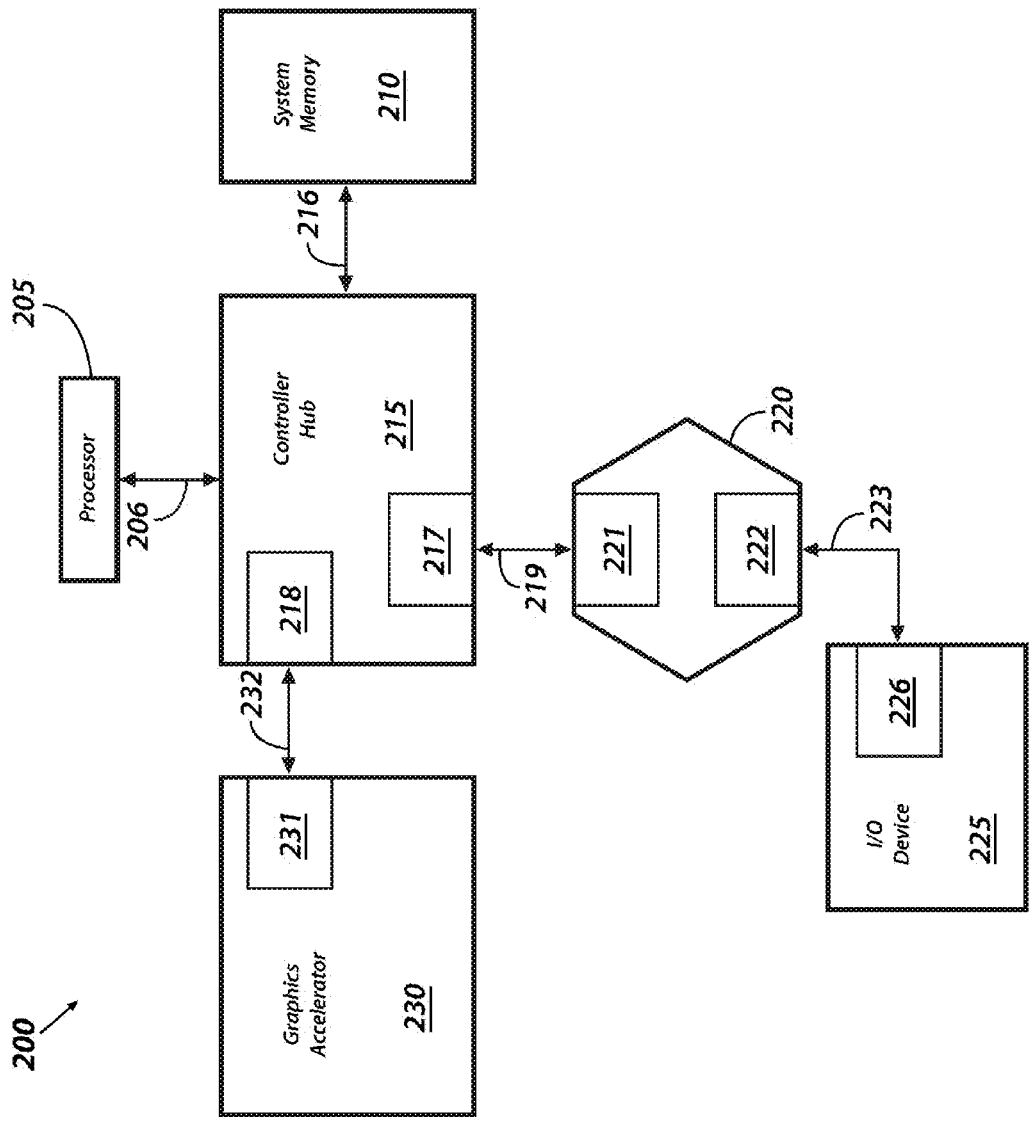
FIG. 2 is a diagram illustrating an embodiment of a computing system including a peripheral component interconnect express (PCIe) compliant architecture.

Referring to FIG. 2, an embodiment of a fabric composed of point-to-point Links that interconnect a set of components is illustrated. System 200 includes processor 205 and system memory 210 coupled to controller hub 215. Processor 205 includes any processing element, such as a microprocessor, a host processor, an embedded processor, a co-processor, or other processor. Processor 205 is coupled to controller hub 215 through front-side bus (FSB) 206. In one embodiment, FSB 206 is a serial point-to-point interconnect as described below. In another embodiment, link 206 includes a serial, differential interconnect architecture that is compliant with different interconnect standard.

System memory 210 includes any memory device, such as random access memory (RAM), non-volatile (NV) memory, or other memory accessible by devices in system 200. System memory 210 is coupled to controller hub 215 through memory interface 216. Examples of a memory interface include a double-data rate (DDR) memory interface, a dual-channel DDR memory interface, and a dynamic RAM (DRAM) memory interface.

In one embodiment, controller hub 215 is a root hub, root complex, or root controller in a Peripheral Component Interconnect Express (PCIe or PCIE) interconnection hierarchy. Examples of controller hub 215 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 205, while controller 215 is to communicate with I/O devices, in a similar manner as described below. In one embodiment, peer-to-peer routing is optionally supported through the root complex device.

Here, controller hub 215 is coupled to switch/bridge 220 through serial link 219. Input/output modules 217 and 221, which may also be referred to as interfaces/ports 217 and 221, include/implement a layered protocol stack to provide communication between controller hub 215 and switch 220. In one embodiment, multiple devices are capable of being coupled to switch 220.

Switch/bridge 220 routes packets/messages from device 225 upstream, i.e. up a hierarchy towards a root complex, to controller hub 215 and downstream, i.e. down a hierarchy away from a root controller, from processor 205 or system memory 210 to device 225 (i.e. interface ports 22, 226 through serial link 223). Switch 220, in one embodiment, is referred to as a logical assembly of multiple virtual PCI-to-PCI bridge devices. Device 225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 225 may include a PCIe to PCI/PCI-X bridge to support legacy or other version PCI devices. Endpoint devices in PCIe are often classified as legacy, PCIe, or root complex integrated endpoints.

Graphics accelerator 230 is also coupled to controller hub 215 through serial link 232. In one embodiment, graphics accelerator 230 is coupled to an MCH, which is coupled to an ICH. Switch 220, and accordingly I/O device 225, is then coupled to the ICH. I/O modules 231 and 218 are also to implement a layered protocol stack to communicate between graphics accelerator 230 and controller hub 215. Similar to the MCH discussion above, a graphics controller or the graphics accelerator 230 itself may be integrated in processor 205.

Turning to FIG. 3 an embodiment of a layered protocol stack is illustrated. Layered protocol stack 300 includes any form of a layered communication stack, such as a Quick Path Interconnect (QPI) stack, a PCIe stack, a next generation high performance computing interconnect stack, or other layered stack. Although the discussion immediately below in reference to FIGS. 2-5 are in relation to a PCIe stack, the same concepts may be applied to other interconnect stacks. In one embodiment, protocol stack 300 is a PCIe protocol stack including transaction layer 305, link layer 310, and physical layer 320. An interface, such as interfaces 217, 218, 221, 222, 226, and 231 in FIG. 2, may be represented as communication protocol stack 300. Representation as a communication protocol stack may also be referred to as a module or interface implementing/including a protocol stack.

PCI Express uses packets to communicate information between components. Packets are formed in the Transaction Layer 305 and Data Link Layer 310 to carry the information from the transmitting component to the receiving component. As the transmitted packets flow through the other layers, they are extended with additional information necessary to handle packets at those layers. At the receiving side the reverse process occurs and packets get transformed from their Physical Layer 320 representation to the Data Link Layer 310 representation and finally (for Transaction Layer Packets) to the form that may be processed by the Transaction Layer 305 of the receiving device.

Transaction Layer

In one embodiment, transaction layer 305 is to provide an interface between a device's processing core and the interconnect architecture, such as data link layer 310 and physical layer 320. In this regard, a primary responsibility of the transaction layer 305 is the assembly and disassembly of packets (i.e., transaction layer packets, or TLPs). The transaction layer 305 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 305. An external device at the opposite end of the link, such as controller hub 115 in FIG. 1, which counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 305 assembles packet header/payload 306. Format for current packet headers/payloads may be found in the PCIe specification at the PCIe specification website.

Quickly referring to FIG. 4, an embodiment of a PCIe transaction descriptor is illustrated. In one embodiment, transaction descriptor 400 is a mechanism for carrying transaction information. In this regard, transaction descriptor 400 supports identification of transactions in a system. Other potential uses include tracking modifications of default transaction ordering and association of transaction with channels.

Transaction descriptor 400 includes global identifier field 402, attributes field 404 and channel identifier field 406. In the illustrated example, global identifier field 402 is depicted comprising local transaction identifier field 408 and source identifier field 410. In one embodiment, global transaction identifier 402 is unique for all outstanding requests.

According to one implementation, local transaction identifier field 408 is a field generated by a requesting agent, and it is unique for all outstanding requests that require a completion for that requesting agent. Furthermore, in this example, source identifier 410 uniquely identifies the requestor agent within a PCIe hierarchy. Accordingly, together with source ID 410, local transaction identifier 408 field provides global identification of a transaction within a hierarchy domain.

Attributes field 404 specifies characteristics and relationships of the transaction. In this regard, attributes field 404 is potentially used to provide additional information that allows modification of the default handling of transactions. In one embodiment, attributes field 404 includes priority field 412, reserved field 414, ordering field 416, and no-snoop field 418. Here, priority sub-field 412 may be modified by an initiator to assign a priority to the transaction. Reserved attribute field 414 is left reserved for future, or vendor-defined usage. Possible usage models using priority or security attributes may be implemented using the reserved attribute field.

In this example, ordering attribute field 416 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes may pass writes in the same direction, and read completions may pass writes in the same direction. Snoop attribute field 418 is utilized to determine if transactions are snooped. As shown, channel ID Field 406 identifies a channel that a transaction is associated with.

Link Layer (Refer to FIG. 3)

Link layer 310, also referred to as data link layer 310, acts as an intermediate stage between transaction layer 305 and the physical layer 320. In one embodiment, a responsibility of the data link layer 310 is providing a reliable mechanism for exchanging Transaction Layer Packets (TLPs) between two components a link. One side of the Data Link Layer 310 accepts TLPs assembled by the Transaction Layer 305, applies packet sequence identifier 311, i.e. an identification number or packet number, calculates and applies an error detection code, i.e. CRC 312, and submits the modified TLPs to the Physical Layer 320 for transmission across a physical to an external device.

Physical Layer

In one embodiment, physical layer 320 includes logical sub block 321 and electrical sub-block 322 to physically transmit a packet to an external device. Here, logical sub-block 321 is responsible for the "digital" functions of Physical Layer 321. In this regard, the logical sub-block includes a transmit section to prepare outgoing information for transmission by physical sub-block 322, and a receiver section to identify and prepare received information before passing it to the Link Layer 310.

Physical block 322 includes a transmitter and a receiver. The transmitter is supplied by logical sub-block 321 with symbols, which the transmitter serializes and transmits onto to an external device. The receiver is supplied with serialized symbols from an external device and transforms the received signals into a bit-stream. The bit-stream is de-serialized and supplied to logical sub-block 321. In one embodiment, an 8b/10b transmission code is employed, where ten-bit symbols are transmitted/received. Here, special symbols are used to frame a packet with frames 323. In addition, in one example, the receiver also provides a symbol clock recovered from the incoming serial stream.

As stated above, although transaction layer 305, link layer 310, and physical layer 320 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

As the frequency of serial links increase and chips migrate to new process technologies with ever decreasing device sizes, it becomes increasingly important to provide the capability to dynamically adjust the transmitter and receiver equalization settings to account for platform and silicon variations.

PCIe Generation 3 (PCIe Gen3) is an example of an industry standard that has equalization on a per transmitter-receiver pair basis to ensure interoperability at 8 GT/s for the wide range of systems that deploy PCIe. However, the wide variety of devices, manufactured by different vendors, with different process technologies, each with their proprietary transmitter/receiver design, and proprietary hardware algorithms to adapt makes it a challenge to design components with guaranteed interoperability.

Referring next to FIG. 5, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 506/511 and a receive pair 512/507. Accordingly, device 505 includes transmission logic 506 to transmit data to device 510 and receiving logic 507 to receive data from device 510. In other words, two transmitting paths, i.e., paths 516 and 517, and two receiving paths, i.e., paths 518 and 519, are included in a PCIe link.

A transmission path refers to any path for transmitting data, such as a transmission line, a copper line, an optical line, a wireless communication channel, an infrared communication link, or other communication path. A connection between two devices, such as device 505 and device 510, is referred to as a link, such as link 515. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 516 and 517, to transmit differential signals. As an example, when line 516 toggles from a low voltage level to a high voltage level, i.e., a rising edge, line 517 drives from a high logic level to a low logic level, i.e., a falling edge. Differential signals potentially demonstrate better electrical characteristics, such as better signal integrity, i.e., cross-coupling, voltage overshoot/undershoot, ringing, etcetera. This allows for better timing window, which enables faster transmission frequencies.

The present disclosure includes selecting tap coefficients based on which coefficient(s) provide the communication link with the highest tolerance to jitter. In some embodiments, a jitter tolerance based equalization method may be implemented via software algorithms. For example, a jitter tolerance based equalization method consistent with the present disclosure may be applied to various high speed serial links which require equalization training (e.g. PCIe, DMI, and QPI).

In one embodiment, an algorithm consistent with the present disclosure loops over various equalization coefficients considered as potential candidates and runs a link health experiment for each coefficient. Advantageously, the present disclosure may implement a software solution to employ jitter tolerance based equalization.

FIG. 6 is a diagram illustrating an algorithm loop 600 for performing a link health experiment. The link health experiment may include testing various equalization coefficients (TxEQs) to determine which coefficient yields the greatest jitter tolerance for each lane. As shown in the figure, the first health experiment procedure begins with block 601 (START) and proceeds along path 651 to block 602—"More equalization coefficients (e.g., TxEQs) to Test?".

At block 602, the link health experiment procedure makes a determination to whether there are any remaining TxEQs to apply to a lane of a communication link (or "link") when testing the jitter tolerance of the link. For example, if three TxEQs are to be tested, and less than three TxEQs have been tested, the algorithm 600 will proceed to block 604 (via path 655) to test the next untested TxEQ.

One having ordinary in the art may appreciate that any number of equalization coefficients may be tested. As such, the present disclosure is not limited to testing only three TxEQs, as described in the previous embodiment, but may include testing more or less than three equalization coefficients which is in the spirit and scope of the present disclosure. For instance, 1, 5, or 10 equalization coefficients may be tested. It should be further understood by one having ordinary skill in the art that the time period for the link health experiment procedure may be a factor when choosing the number of equalization coefficients to test.

Block 604 provides "[r]etrain link to TxEQ" followed by "[t]est link jitter tolerance" (block 606 via path 656) as will be described in more detail below. Alternatively, if no other equalization coefficients are to be tested, the link health experiment procedure proceeds to block 603 (via path 652). As shown, block 603 provides "choos[ing] the equalization coefficient which yielded the best performance results." As will be explained in more detail, the TxEQs which yielded the best results are the particular equalization coefficients per lane which the lane performed with the highest degree of induced jitter before failing. In one embodiment, failing may be characterized as an inability to maintain a bit error rate threshold (e.g. $10^{-12}$) across the lane according to a communication protocol (e.g., PCIe).

Next, block 605 provides that the link is retrained to adopt the TxEQ which yielded the best performance results (e.g. greatest tolerance to jitter) for the respective tested lane. In one embodiment of the present disclosure, the link is retrained according to a specific protocol. For example, a PCIe link may be retrained according to a PCIe 3.0 equalization protocol. Accordingly, after the last TxEQ is tested, the link health experiment procedure ends (block 607 via path 654).

Figure 7:
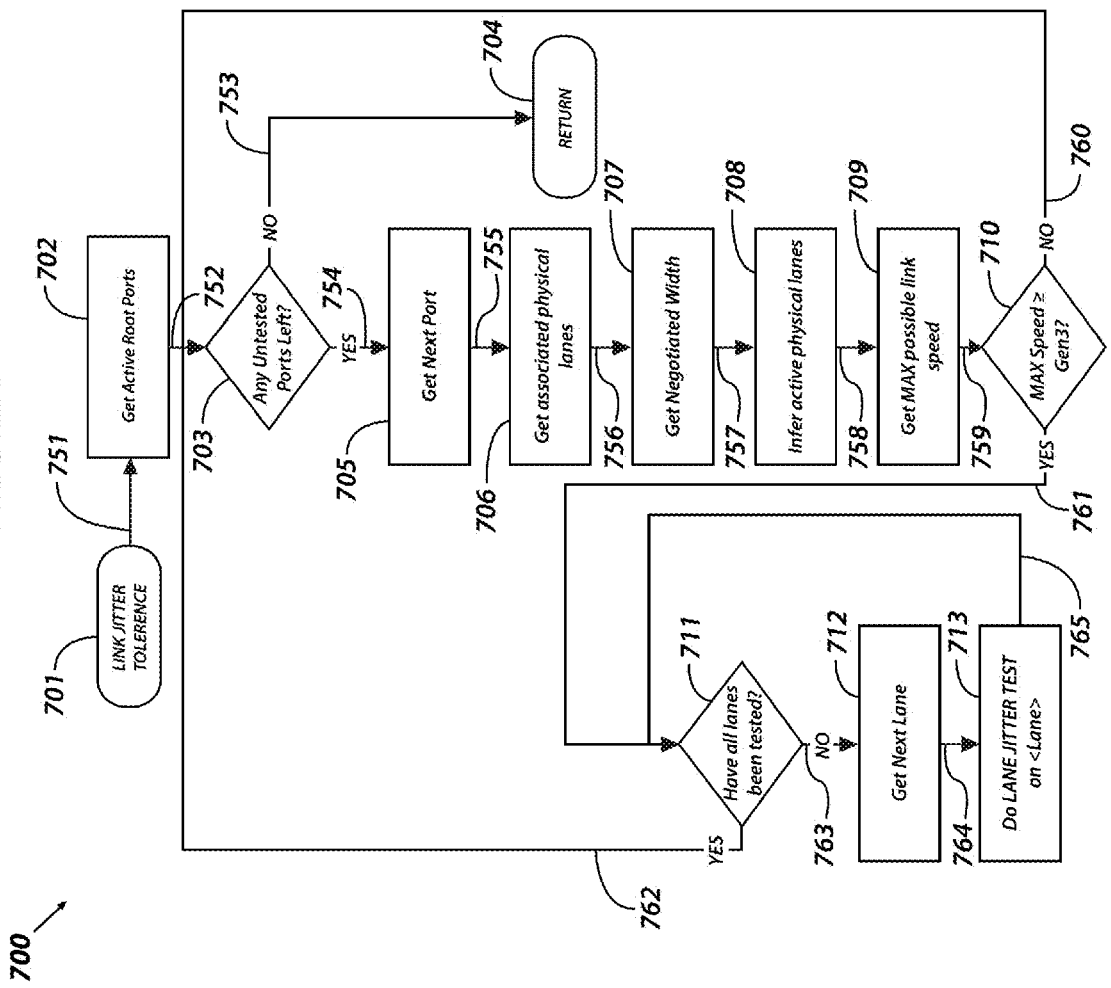
FIG. 7 is a diagram illustrating an algorithm loop for determining the jitter tolerance of a communication link.

FIG. 7 is a diagram illustrating an algorithm loop 700 for determining the jitter tolerance of a communication link. The jitter tolerance procedure 701 begins with block 702—"Get Active Root Ports" (see path 751). In one embodiment, a root port, also referred to as a root complex port, may spawn a communication link hierarchy (e.g., PCIe hierarchy). In particular, a root complex device may have more than one root port each having a distinct hierarchy domain. For example, a root complex device may have two or more root ports coupled to two or more PCIe nodes.

In time, the link jitter tolerance procedure 701 proceeds to block 703 (via path 752)—"Any untested root ports left?". If there are no other root ports to test, the link jitter tolerance procedure 701 proceeds to RETURN block 704 via path 753. RETURN block 704 directs control back to block 602 of the algorithm loop 600 referred to in FIG. 6.

Alternatively, if there are any root ports that are untested (block 703), the link jitter tolerance procedure 701 moves along path 754 to block 705—"Get Next Port" and then to block 706 via path 755, "[g]etting associated physical lanes." One having ordinary skill in the art may appreciate that a link coupled between ports (e.g., between a root complex device and an endpoint device) may have a plurality of lanes. For example, PCI Express 3.0 slots may contain from 1 to 32 lanes, in powers of two (1, 2, 4, 8, 16, and 32).

Further, according to block 707 (see path 756)—"[g]et negotiated width." In one embodiment, during initialization, each PCIe link may set up following a negotiation of link widths and frequency of operation by the two agents (e.g., PCIe devices) at each end of the link. In one embodiment, PCIe utilizes a broadcast technique for two link partners to perform lane negotiation. For instance, PCIe may utilize training sets to negotiate lane width and ordering.

Further, "[i]nfer active physical lanes" according to block 708. Further, block 709 (via path 758) provides—"[g]et maximum possible link speed." For example, PCIe 3.0 provides a maximum possible link speed of 8 GT/s (e.g., Gen3 Speed). If the MAX Speed≥Gen3 Speed (block 710 via path 759), the link jitter tolerance procedure proceeds to block 711—"Have all lanes been tested?" (e.g., via path 761). If all lanes have been tested, the procedure 701 returns via path 762 to block 703.

Alternatively, if all lanes have not been tested, the link jitter tolerance procedure 701 proceeds to block 712 (via path 763)—"Get Next Lane." For example, if a link has 16 lanes and lane 0 was previously tested, lane 1 may be tested next according to block 713 (via path 764) as shown in the figure. In one embodiment, the link jitter tolerance procedure 701 iterates through the lane test loop (blocks 711-713) until each lane of the link has been tested. A lane jitter test procedure will be described in more detail below in reference to FIG. 8.

In the event that the conditional statement at block 710 is NOT TRUE, the link jitter tolerance procedure reverts back to block 703 (via path 760). If no other ports remain for testing, block 704 returns to block 602 of the link health experiment procedure 601 shown in FIG. 6.

Figure 8:
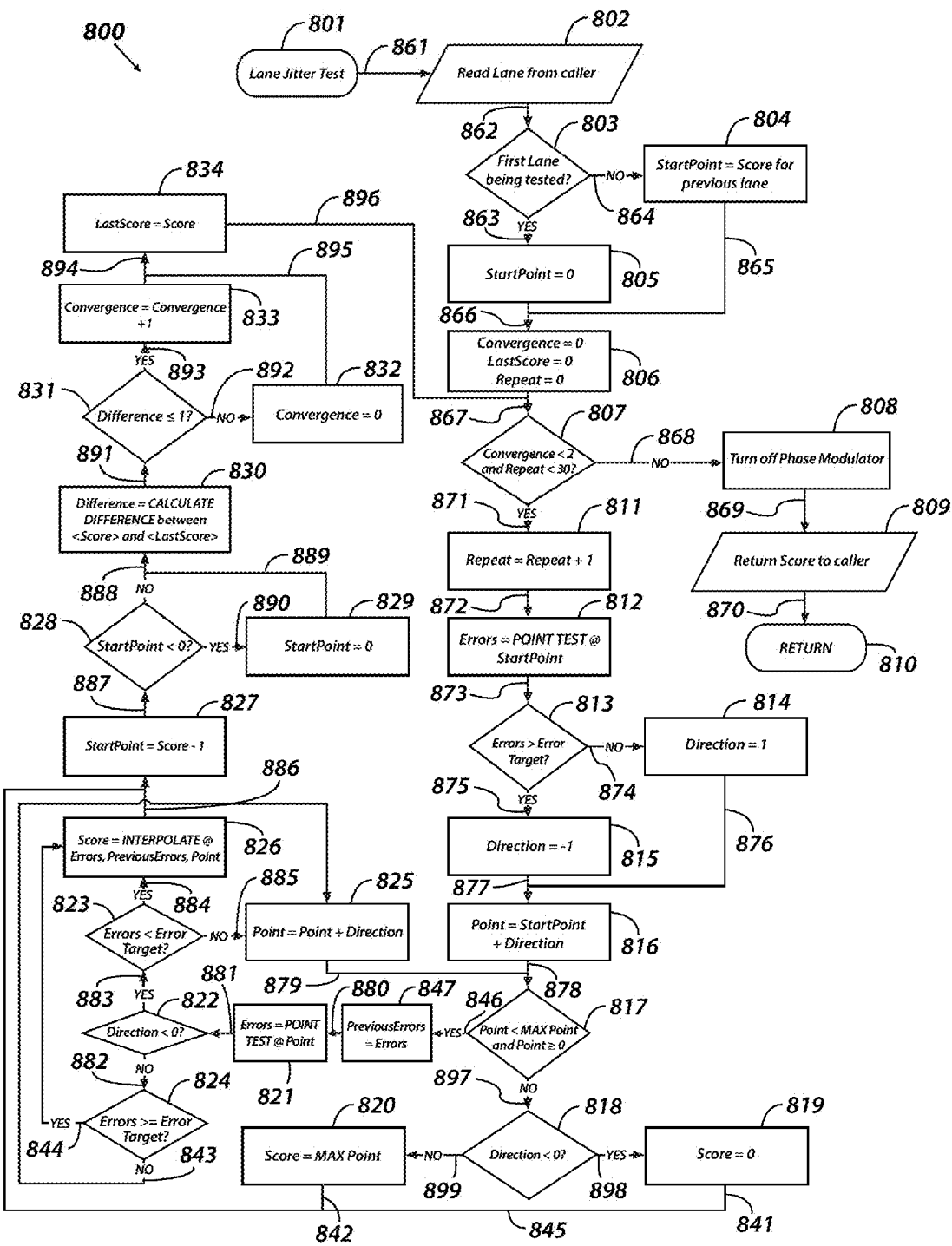
FIG. 8 is a diagram illustrating an algorithm loop for a lane jitter test for each lane of a communication link.

FIG. 8 is a diagram illustrating an algorithm loop 800 for a lane jitter test procedure 801 for each lane of a communication link. In one embodiment, algorithm loop 800 may be implemented as a function. Block 713 of algorithm 700 may be referred to as the caller which provides the lane to be tested. In one embodiment, lane jitter test 801 assigns and stores a score to each lane of a link for a particular TxEQ.

The lane jitter test procedure 801 begins along path 861 with block 802—"Read Lane from Caller." Once the lane is read from the caller, algorithm loop 800 proceeds to block 803—"First Lane being tested?" via path 862. If the first lane (e.g., lane 0) is being tested, the lane jitter test procedure proceeds to block 805 via path 863 and sets the value of the variable StartPoint to 0 as illustrated in the figure.

In the event that any lane other than the first lane is read from the caller, the variable StartPoint is assigned the score assigned to the previous lane in accordance with block 804 (see path 864). The value assigned to StartPoint is propagated throughout algorithm loop 800 (via path branch 865) and applied accordingly as described herein. Alternatively, if the first lane is being tested, the values of StartPoint, Convergence, LastScore, and Repeat variables are all set to 0 (blocks 805, 806) via paths 863 and 866.

In addition, if the first lane is not being tested, the LastScore and Convergence variables are assigned values according to blocks 833, 834. The variables LastScore and Convergence are initially given the value of 0 by block 806 before blocks 833 and 834 regardless of whether the first lane is being tested or not (see path 865). Next, according to path 867, algorithm loop 800 proceeds to block 807 which provides a conditional branch to test whether Convergence is less than 2 and Repeat less than 30. In one embodiment, Convergence represents the number of iterations that the lane jitter test procedure 801 returns the same score, per equalization coefficient, for the tested lane whereas Repeat represents the number of iterations the lane jitter test is performed for the tested lane.

A lane may be tested a maximum number of iterations to prevent the lane jitter test from iterating an infinite number of times. For example, each lane may be tested a maximum of 30 iterations.

If the result of the conditional branch 807 is TRUE, the lane jitter test procedure 801 proceeds along path 871 to block 811 where the Repeat variable is incremented by 1 (i.e., Repeat=Repeat+1). Once Repeat has been incremented, the procedure 801 continues via path 872 to block 812 to assign a value to an Errors variable. As shown, the variable Errors is assigned a value according to a POINT TEST function.

Figure 9:
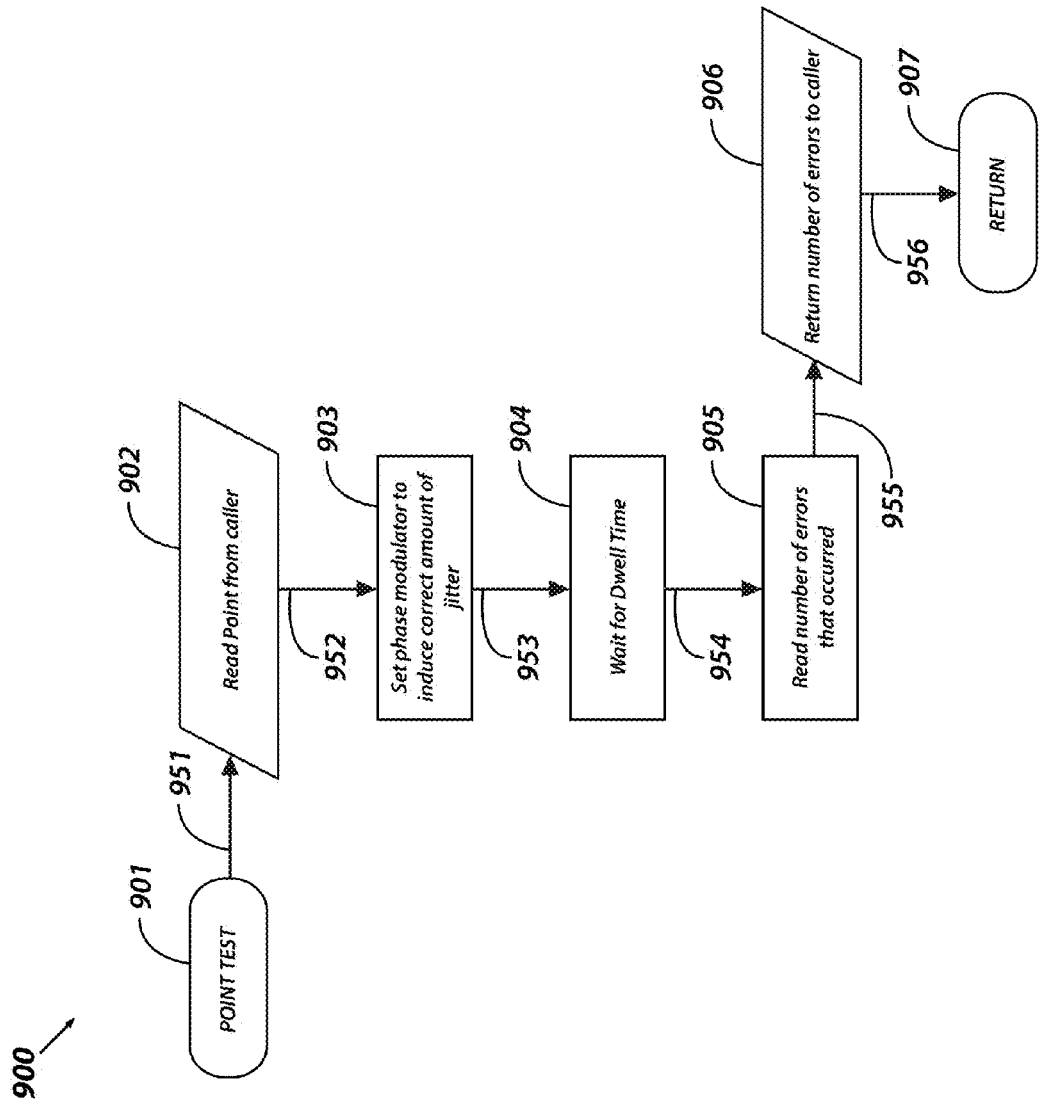
FIG. 9 is a flowchart for a point test procedure implemented during the lane jitter test.

FIG. 9 is a diagram illustrating an algorithm loop 900 for a POINT TEST function 901 implemented during the lane jitter test procedure. When the POINT TEST function is called (e.g., from block 812 of FIG. 8), algorithm loop 900 begins with block 902 (via path 951)—"Read Point from Caller." According to block 812, the point read from the caller is the value of Startpoint.

Next, block 903 provides "Set phase modulator to induce the correct amount of jitter" (via path 952). For example, the point received from the caller may range from 0-24. In one embodiment, if the point received from the caller is equal to 1, the phase modulator induces a minimal quantity of jitter into the tested lane. Alternatively, if the Point received from the caller is 24, the phase modulator induces a maximum quantity of jitter into the tested lane.

In one embodiment, in order to set the phase modulator to induce the correct level of jitter into a lane, a minimum period of time must elapse to sufficiently induce errors within the lane. The period of time to generate a target quantity of errors may be referred to as the "dwell time." Once the phase modulator induces jitter into the lane, the POINT TEST function moves along path 953 to block 904—"Wait for Dwell Time."

Figure 12:
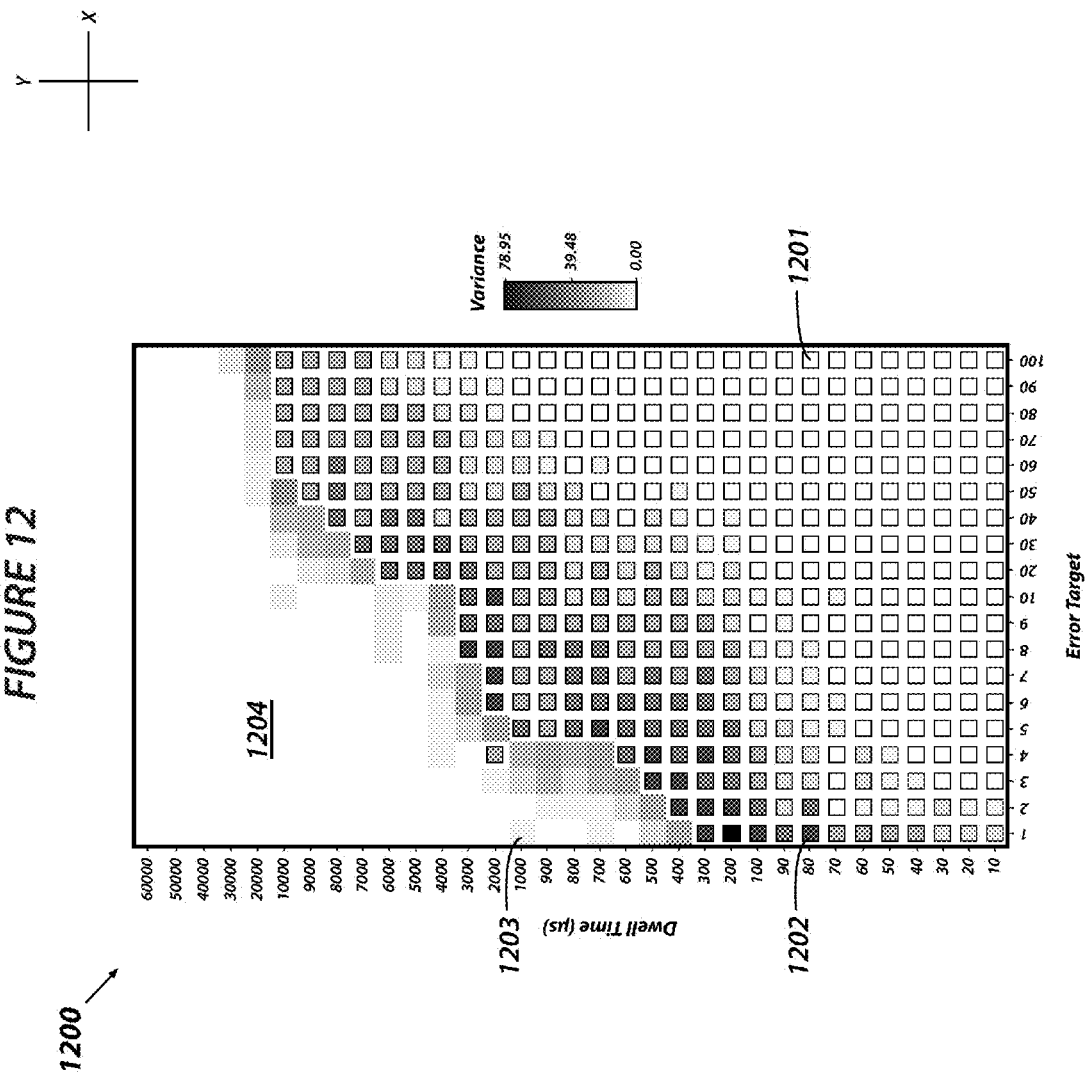
FIG. 12 is a diagram illustrating a table listing the dwell time for per error target.

Now referring to FIG. 12, a diagram illustrating a table 1200 listing the dwell time per error target is shown. As shown, a table 1200 illustrates various points 1201 of dwell times per various error targets. Points 1201 with dark shade are values outside of the usable range. In addition, the darker shade of point 1202 indicates an elevated statistical variance.

Area 1204 of the table 1200 consists of acceptable dwell times for each error target. For instance, for an error target of 1, a dwell time of 400-500 microseconds may be suitable. However, a dwell time of 1000 microseconds provides enough time for random error events (i.e., intersymbol interferences) to occur. As such, a dwell time may be comparatively large relative to a clock frequency of the link.

The error target may be configurable as shown in table 1200. For example, the error target may be configured to any number such as, but not limited to, between 1 and 100. In one embodiment, for an error target configured to 1, an acceptable dwell time exceeds 400 microseconds. It should be understood by one having ordinary skill in the art that the time period of the link health experiment procedure and particularly the time period for the POINT TEST function to transpire may be considered when choosing the dwell time for a particular error target.

Further, the duty cycle of the jitter signal generated by the phase modulator and induced into each respective lane may be as low as 5%. As such, to induce an effective level of jitter, the worst case peaking of a duty cycle should align in phase with the worst case intersymbol interference (ISI) occurring randomly. Therefore, it may be advantageous in one embodiment to choose a sufficient dwell time for ISI events to occur.

Returning back to the POINT TEST function 901 of FIG. 9, after the sufficient dwell time has elapsed, the function proceeds along path 954 to block 905—"Read number of errors that occurred." Accordingly, after the phase modulator induces a predetermined level of jitter in a lane, the number of errors (e.g., CRC errors) of the tested lane is read therefrom. In one embodiment, the maximum level of jitter that the link can withstand at the initial point of failure may be construed as the link's jitter tolerance.

Next, according to path 955, the POINT TEST function proceeds to block 906 to return (block 907 along path 956) the number of errors to the caller (e.g., block 812 of the lane jitter test procedure).

Now referring back to the lane jitter test procedure 801 illustrated in FIG. 8, the number of errors returned from the POINT TEST function is assigned to the Errors variable at block 812. Next, path 873 leads to block 813 which compares Errors to Error Target. In particular, block 813 is a conditional branch—"Errors>Error Target." If the result of the conditional branch is NOT TRUE, the procedure 801 proceeds along path 874 to block 814.

Block 814 sets the Direction variable to positive one (1) if the result of the conditional branch is NOT TRUE. Alternatively, if the result of the conditional branch at block 813 is TRUE, the lane jitter test procedure 801 proceeds along path 875 to block 815 and sets the Direction variable to negative one (−1). The Direction variable may be set to any of various positive or negative integer constants.

As such, the present disclosure is not limited to setting the Direction variable to 1 or −1 or another integer. The Direction variable may be set to any number which enables the lane jitter test procedure 801 to determine at which point the tested lane begins to fail.

After a value has been assigned to Direction, block 816 (see paths 876, 877 provides that the Point variable is calculated by assigning the variable the sum of the values of StartPoint and Direction as illustrated in the figure. After the value of the Point variable is calculated, the lane jitter test procedure 801 proceeds along path 878 to block 817 which provides the following conditional statement: Point<MAX Point and Point≥0.

If the result of the conditional statement at block 817 is TRUE, the lane jitter test procedure 801 proceeds along path 846 to block 847 where the value of the PreviousErrors variable is assigned the value of Errors. Next, path 880 leads to block 821 which assigns a value to the Errors variable. As shown in the figure, the value assigned to Errors is provided by the POINT TEST function (at the value of the Point variable).

As described above in reference to FIG. 9, the POINT TEST function returns the quantity of errors which occurs after the phase modulator induces a target level of jitter into the tested lane. In particular, the phase modulator may induce a level of jitter in the lane consistent with the value of the Point variable sent to the POINT TEST function.

In the event the result of the conditional statement at block 817 is NOT TRUE, the lane jitter test procedure 801 proceeds along path 897 to block 818 which provides another conditional statement: Direction<0. If the value of the Direction variable is less than 0 (e.g., −1), the procedure 801 proceeds along path 898 to block 819 where the value of the Score variable is assigned the value of 0. In this instance, the value of Point has decremented to its lowest possible value (e.g., 0).

Alternatively, if the result of the conditional statement is TRUE (i.e., the value of Direction is greater than 1), the lane jitter test procedure 801 moves along path 899 to block 820 where the value of Score is assigned the maximum point (e.g., 24). In this instance, the value of Point has incremented to its highest possible value.

Once the value of Score has been assigned (blocks 819, 820), the lane jitter test procedure 801 uses the scores (see branches 841, 842 and path 845) to determine the value of the new StartPoint in block 827 (i.e., StartPoint=Score−1).

Returning back to block 821, once the POINT TEST function returns a value which is assigned to Errors, the lane jitter test procedure 801 proceeds along path 881 to block 822. As shown, block 822 provides a conditional statement (Direction<0?). If the result of the conditional statement is TRUE, the procedure proceeds via path 883 to block 823 which provides another conditional statement (Errors<Error Target?).

The result of the conditional statement at block 823 may lead to block 825 or block 826. If the result of the conditional statement is TRUE, Score is assigned the value returned from an INTERPOLATE function. The INTERPOLATE function is described below in detail in reference to FIG. 10.

Figure 10:
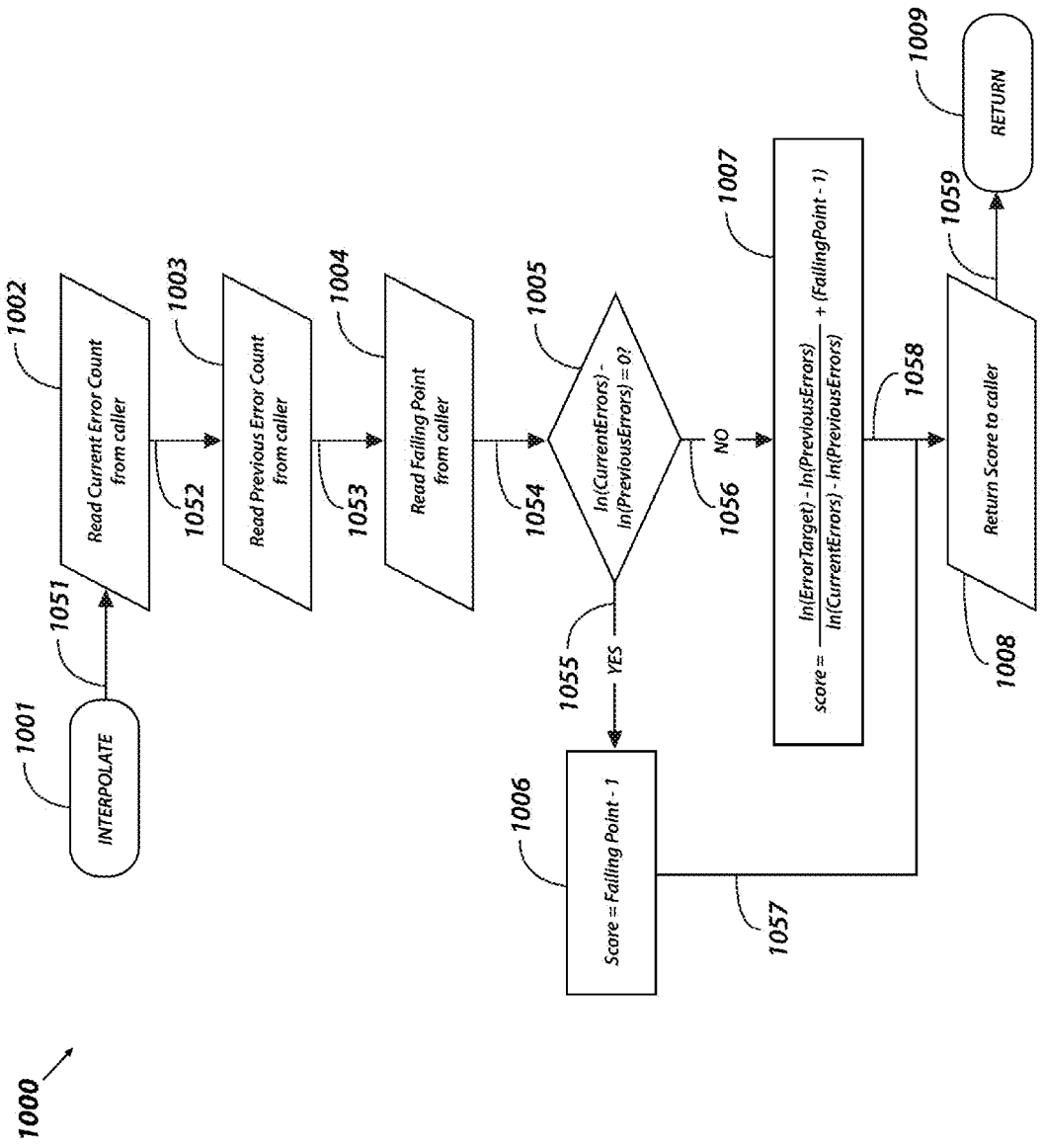
FIG. 10 is a flowchart for a interpolate procedure implemented during the lane jitter test.

FIG. 10 is a diagram illustrating a flowchart 1000 for a interpolate procedure 1001 implemented during the lane jitter test. As shown, the interpolate procedure 1001 starts along path 1051 to block 1002—"Read Current Error Count from Caller."

Once the current error is read from the caller, the interpolate procedure 1001 proceeds via path 1052 to block 1003—"Read Previous Error Count from Caller" and subsequently proceeds to block 1004—"Read Failing Point from Caller" via path 1053. As such, the INTERPOLATE procedure reads the Current Error Count, Previous Error Count, and Failing Point from the caller (e.g., block 826 of FIG. 8). In one embodiment, the Current Error Count is read from the Errors variable, the Previous Error Count is read from the PreviousErrors variable, and the Failing Point is read from the Point variable as illustrated in FIG. 8.

Next, moving along path 1054, interpolate procedure 1001 provides a conditional statement in block 1005—"ln(CurrentErrors)−ln(PreviousErrors)=0?". If the result of the conditional statement in block 1005 is TRUE, the interpolate procedure 1001 proceeds along path 1055 and Score is calculated according to the formula shown in block 1006 (Score=FailingPoint−1) and is returned (via path 1057) to the caller (e.g., block 826 of FIG. 8) according to blocks 1008, 1009 (see path 1059).

Alternatively, if the result of the conditional statement in block 1005 is NOT TRUE, the interpolate procedure 1001 moves along to block 1007 via path 1056 to calculate the variable Score according to the following score equation below:

$$\text{Score} = [\ln(ErrorTarget) - \ln(PreviousErrors)] /$$
$$[\ln(CurrentErrors) - \ln(PreviousErrors)] + (FailingPoint - 1)$$

As expressed in the aforementioned equation, interpolation is performed between the failing point and the point before it. In one embodiment, logarithmic interpolation is used because of its superior noise filtering capability. Interpolation may be performed between the number of errors discovered at the failing point and the point before it. In one embodiment, a point is considered failing once the number of errors (e.g., CRC errors) causes the lane to fail.

In one embodiment, the value of Score will be between 0 and 24. However, one having ordinary skill in the art may appreciate that the value of Score may be within another range of numbers. For example, the range of values for the Score variable may be between 0 and 35. The maximum score may be changed based on the hardware implementation of the device (e.g., video card).

After the score is calculated according to block 1007, the interpolate procedure proceeds to block 1008 and returns the value of Score variable to the caller (e.g., the lane jitter test procedure referred to in FIG. 8).

Now referring back to FIG. 8, once Score variable is assigned the value returned from the INTERPOLATE function, the lane jitter test procedure 801 proceeds to block 827 via path 886. As illustrated in the figure, block 827 provides that StartPoint is calculated by decrementing Score by 1 (i.e., StartPoint=Score−1). As such, the lane jitter test procedure 801 will later begin testing the next lane (read from caller block 713 of FIG. 7) at one less than the initial start of failure of the previously tested lane.

It may be understood by one having ordinary skill in the art that adjacent lanes may operate similarly such that the initial start of failure between adjacent lanes are within a relatively short range of each other. It may be advantageous to begin testing at another point other than failing point (e.g., the initial start of failure) of the previously tested lane in order to prevent the next tested lane from immediately failing thereby disrupting the system. For instance, if the next lane is induced with jitter at a level which caused the previously tested lane to fail, the system may downgrade the transmission speed of the tested lane to a lower speed (e.g., from PCIe Gen3 speed to PCIe Gen1 or Gen2 speed).

Moreover, the present disclosure is not limited to decrementing Score by 1 at block 827 in an effort to prevent the next tested lane from failing immediately. Score may be decremented or incremented by any predetermined constant or variable in order to prevent the next lane from failing immediately during the lane jitter test procedure for the next lane.

Returning back to block 822, in the event that the result of the conditional statement (Direction<0?) is NOT TRUE, the lane jitter test procedure 801 proceeds along 882 to block 824. As illustrated, block 824 provides the following conditional statement: "Errors≥Error Target?". If the result of the conditional statement at block 824 is TRUE, procedure 801 continues along path 844 to block 826.

For example, if Direction is set to positive one (1) and Errors is greater than or equal to Error Target, the value of Point was incremented to induce a higher level of jitter into the lane which generated errors in the tested lane which met or exceeded the Error Target. In contrast, if the result of the conditional statement in block 824 is NOT TRUE, the value of Point and level of jitter consistent thereto was insufficient to cause the link to fail. As such, Point will be incremented again (see path 843) at block 825 in order to induce an even higher level of jitter into the lane unless Point has reached the maximum value (see block 817).

Returning to block 827, once the value of the StartPoint variable is calculated, the lane jitter test procedure 801 moves along path 887 to block 828. Block 828 provides another conditional statement (i.e., StartPoint<0?). If the result of the conditional statement at block 828 is TRUE, procedure 801 proceeds along path 890 to block 829 and sets StartPoint to 0. Alternatively, if the result of the conditional statement at block 828 is NOT TRUE, the value of the StartPoint variable is maintained from the calculation at block 827.

Paths 888, 889 lead to block 830 where Difference is calculated. As shown, Difference is calculated according to CALCULATE DIFFERENCE function using the values of Score and LastScore. The CALCULATE DIFFERENCE function is described in more detail with reference to FIG. 11.

Figure 11:
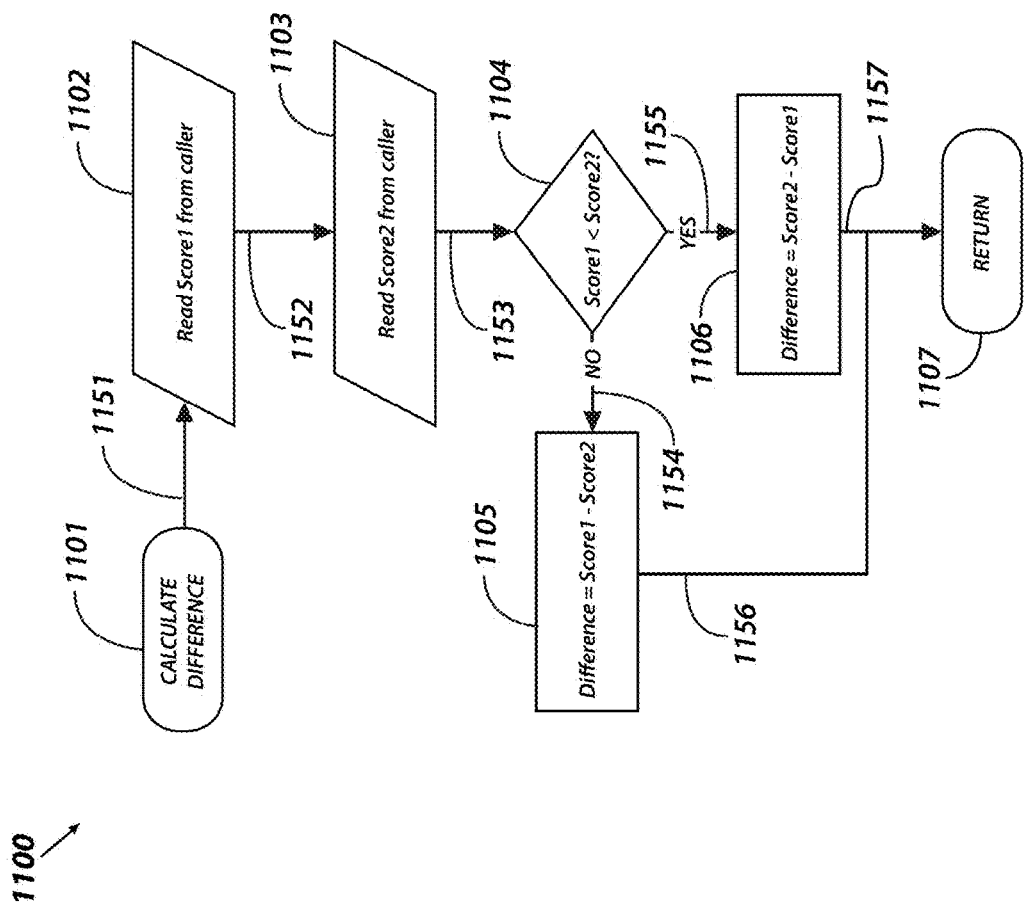
FIG. 11 is a flowchart for a calculate difference procedure implemented during the lane jitter test.

FIG. 11 is a diagram illustrating a flowchart 1100 for a CALCULATE DIFFERENCE function 1101 implemented during the lane jitter test procedure. As shown, the CALCULATE DIFFERENCE function 1101, proceeds to path 1151 to block 1102—"Read Score1 from Caller." In one embodiment, Score1 is assigned the value of Score. Next, procedure 1101 reads Score2 which is assigned the value of the LastScore.

After Score1 and Score2 are read from the caller, the CALCULATE DIFFERENCE function 1101 moves along path 1153 to block 1104 which compares the magnitude of Score1 and Score2. If the result of the conditional statement is NOT TRUE, the function 1101 moves along path 1154 to block 1105 where the value of Difference is calculated by taking the difference of Score1 and Score2 (Difference=Score1−Score2). Alternatively, if the result of the conditional statement is TRUE, the value of Difference is calculated by taking the difference of Score2 and Score1 as illustrated at block 1106. Accordingly, blocks 1104-1106 ensure that Difference is a non-negative value.

Difference is returned (via branch 1156 or path 1157) to the caller (e.g., block 830) as shown by block 1107. Further, path 891 leads to block 831 (Difference≤1?). The result of the conditional statement at block 831 determines the value of Convergence.

As shown, if the conditional statement at block 831 is NOT TRUE, the lane jitter test procedure 801 continues along path 892 to block 832 and sets Convergence to 0. Alternatively, if the conditional statement is TRUE, the procedure 801 proceeds along path 893 to block 833 where Convergence is incremented by 1 (Convergence=Convergence+1).

Path 894 (which branch 895 extends from) leads to block 834 which assigns the value of LastScore to the value of Score. Further, the lane jitter test procedure 801 proceeds along paths 896, 867 to the conditional statement at block 807 as described above.

In one embodiment, if similar scores are returned a consecutive number of times (e.g., 3) for a particular TxEQ of a tested lane, while having performed the jitter test less than a predetermined number of iterations (e.g., 30) for the lane, the lane jitter test procedure 801 will proceed to block 808 via path 868. Finally, at block 808, the device (e.g., phase modulator) which induced artificial jitter in the tested lane is turned off.

In one embodiment, a phase modulator is used to generate and induce jitter into the lane(s). The phase modulator may include an electronic circuit which causes a phase angle of a modulated wave to vary in accordance with a modulated signal. Most notably, the phase modulator may be operable to effect various jitter signals to induce varying levels of jitter into a communication link with the intent to test the performance of the lane at each jitter level induced into the lane. Additionally, the jitter signal generated by the phase modulator may align in phase with an intersymbol interference event in the lane to create a maximum level of jitter during the duty cycle of the jitter signal.

In some instances, injecting a high level of jitter into the lane may cause the analog control loops to have an over-damped oscillatory response. In this event, the jitter tolerance of the link may oscillate with the analog control loops. Advantageously, link jitter test procedure 801 allows the analog control loops to settle and stabilize to increase the integrity and reliability of a given measurement.

To account for these oscillation events, testing may be repeated several times to ensure that the measurement results converge to within one point of the previous measurement multiple times in a row. In one embodiment, the jitter test procedure may be repeated a limited number of times to prevent the procedure 801 from entering into an infinite loop.

In addition, the phase modulator may have multiple settings wherein each setting induces a particular level of artificial jitter in the tested lane. In one embodiment, a phase modulator consistent with the present disclosure has 25 settings (e.g., settings 0-24) wherein each successive setting generates a higher level of artificial jitter. For example, setting 0 may not induce any jitter in a tested lane whereas setting 24 induces the highest level of jitter in the tested lane.

Furthermore, each setting of a phase modulator may be obtained by adjusting the amplitude of an oscilloscope device coupled thereto.

One having ordinary skill in the art may appreciate that the present disclosure is not limited to a phase modulator to induce artificial jitter in a lane. Any system consistent with the present disclosure may be used to induce artificial jitter in each lane of a tested link.

Referring back to block 807, if the result of the conditional statement is TRUE, the phase modulator is turned off and the value of Score is returned to the caller (e.g., block 713 of algorithm loop 700), in accordance with blocks 809, 810 (via paths 869, 870).

Figure 13:
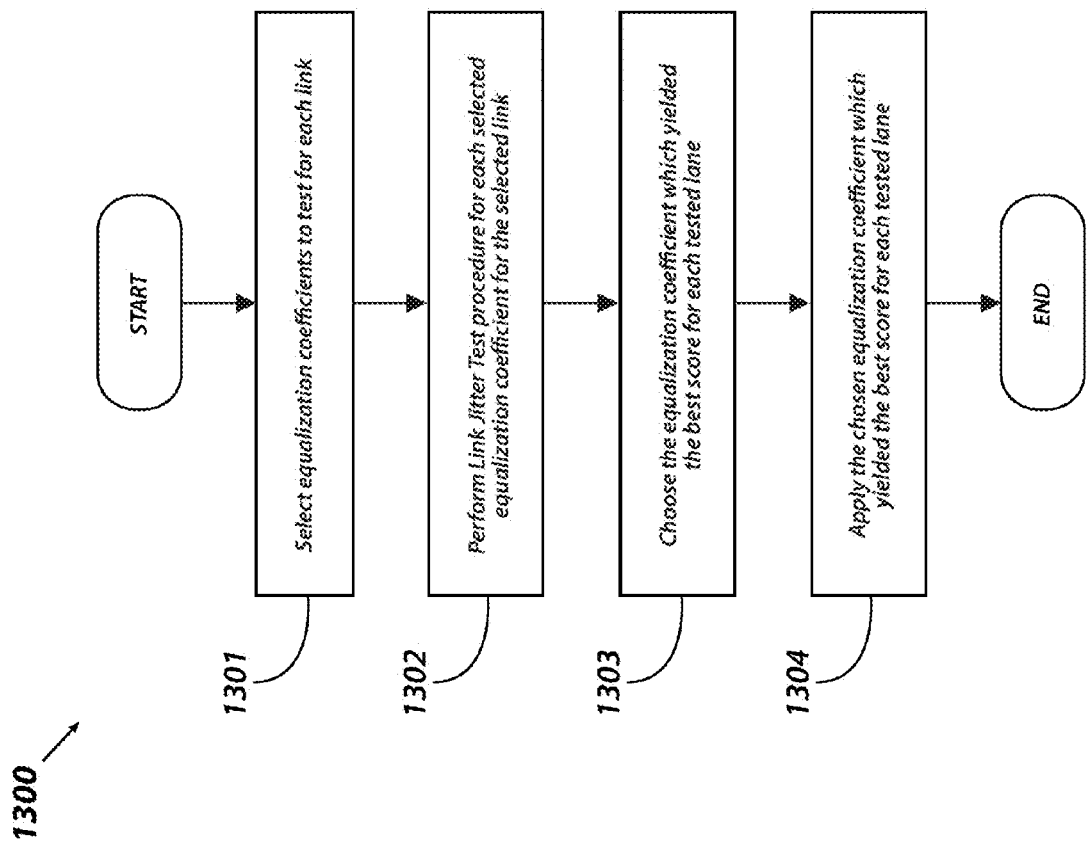
FIG. 13 is a flowchart for performing jitter tolerance based equalization.

A method 1300 to perform jitter tolerance based equalization is shown in FIG. 13. As shown, method 1300 begins with block 1301—"Select equalization coefficient to test for each link."

It should be understood by one having ordinary skill in the art that each selected TxEQ may be tested for each lane of each communication link. For example, a system of devices (e.g., nodes) coupled together via a communication link, according to a communications protocol (e.g., PCIe), will have each lane of each link tested by each selected TxEQ in accordance with link health experiment procedure described herein.

Next, according block 1302, "Perform the link jitter test procedure for each selected equalization coefficient for the selected link." Further, according to block 1303, "Choose the equalization coefficient which yielded the best results (e.g., Score) for each tested lane." Finally, "Apply the chosen equalization coefficient which yielded the best score for each tested lane" (e.g., block 1304).

Figure 14:
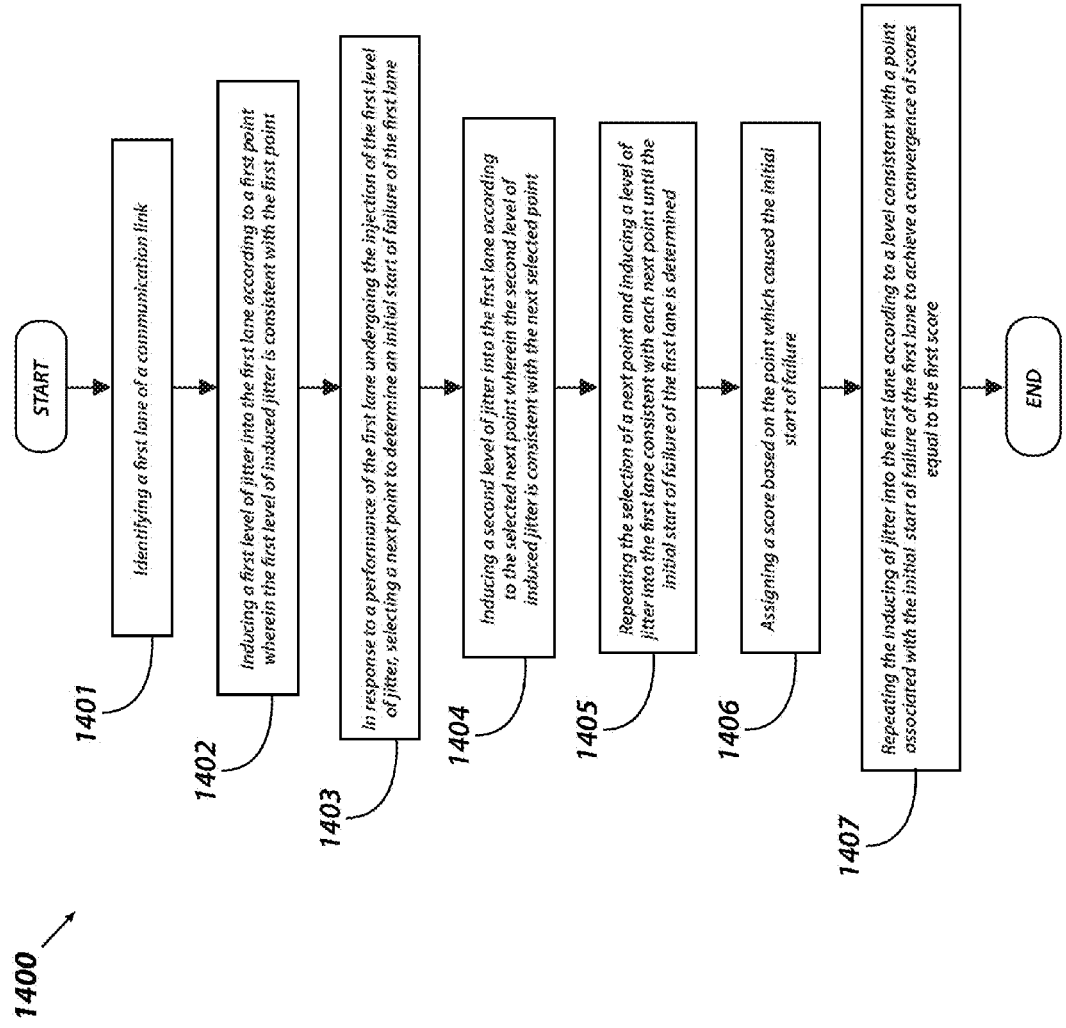
FIG. 14 is a flowchart for performing a jitter test of a lane of a link.

FIG. 14 is a flowchart 1400 for performing jitter tolerance based equalization. The jitter tolerance based equalization procedure begins with block 1401—"Identifying a first lane of a communication link." The first lane may be the first lane of a link or the next successive lane of the link if a lane of the link was previously tested. Next, "inducing a first level of jitter into the first lane according to a first point wherein the first level of induced jitter is consistent with the first point" according to block 1402.

Further, "In response to a performance of the first lane undergoing the injection of the first level of jitter, selecting a next point to determine an initial start of failure of the first lane (block 1403). Next, "Inducing a second level of jitter into the first lane according to the selected next point wherein the second level of induced jitter is consistent with the next selected point" (block 1404).

According to block 1405, "Repeating the selection of a next point and inducing a level of jitter into the first lane consistent with each next point until the initial start of failure of the first lane is determined." Once the initial start of failure is determined, "Assigning a score based on the point which caused the initial start of failure" in accordance with block 1406. Lastly, "Repeating the inducing jitter into the first lane according to a level consistent with the point associated with the initial start of failure of the first lane to achieve a convergence of scores equal to the first score" (block 1407).

Figure 15:
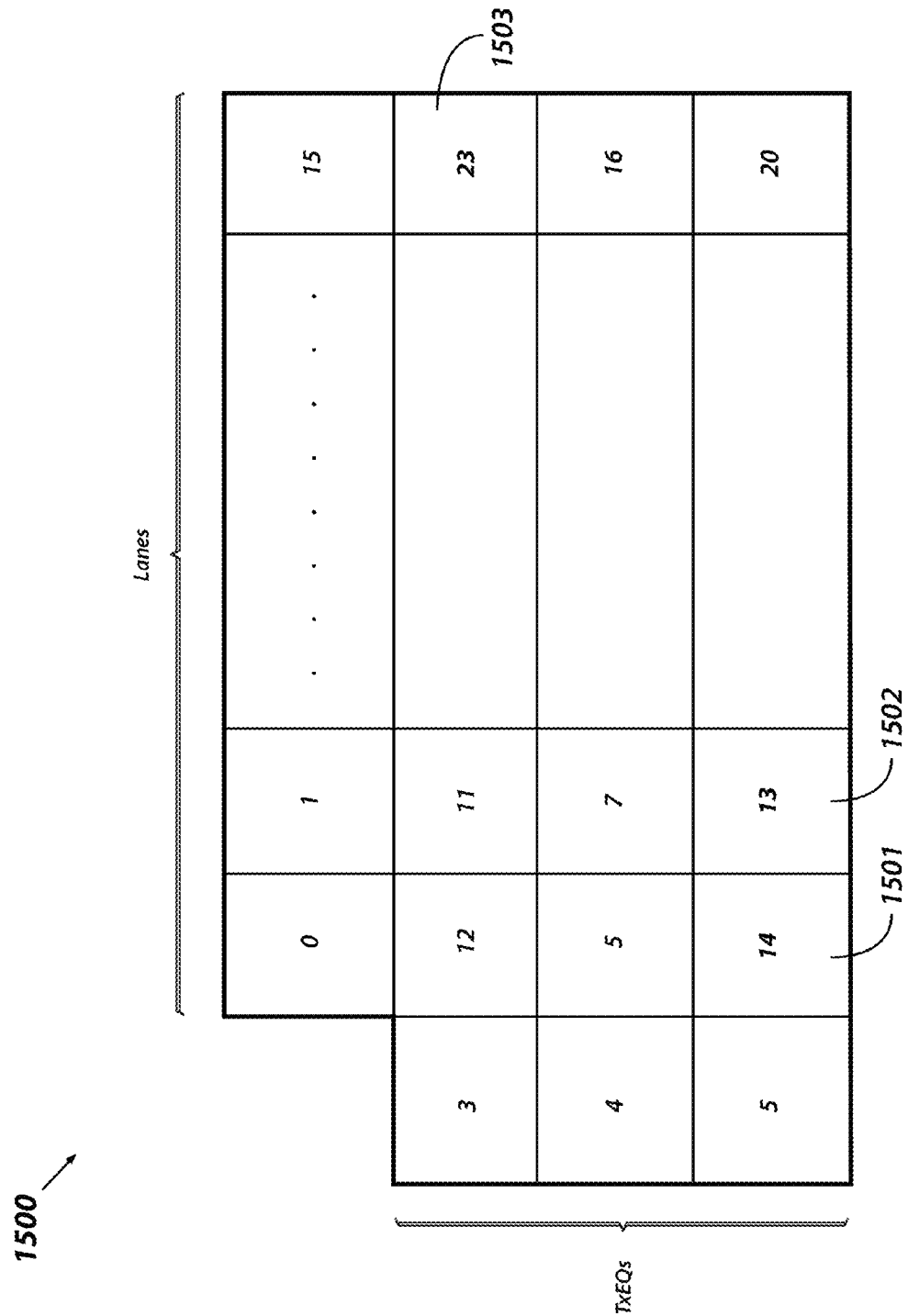
FIG. 15 is a diagram illustrating a table listing performance scores for each TxEQ coefficient tested for each lane of a communication link.

FIG. 15 is a diagram illustrating a table 1500 listing performance scores for each TxEQ tested for each lane of a communication link. In the exemplary embodiment illustrated, scores are listed for each selected TxEQ per tested lane. Table 1500 lists scores assigned to lanes for three equalization coefficients (TxEQs 3, 4, and 5). In one embodiment, Score is an indication of the lane's jitter tolerance such that a higher value for Score indicates a lane that withstands a high level of jitter before failing. In contrast, a lower value of Score indicates that a lane sustained a low level of jitter before failing.

Table 1500 lists the scores for lanes 0, 1, and 15. For instance, the Scores assigned to lane 0 for TxEQs 3, 4, and 5 are 12, 5, and 14, respectively. Notably, lane 0 performed the best and sustained the highest level of jitter when TxEQ 5 was applied to the lane. In addition, TxEQ 5 also provided the best score for lane 1. However, for lane 15, TxEQ 3 yielded the best results (i.e., score of 23).

As described above, the present disclosure may optimize the jitter tolerance of the link by retraining the tested lane with the TxEQ which yielded the best performance results. However, the link may be characterized based on the lowest applied TxEQ to a lane of the link during the link health experiment procedure. For example, for the link results displayed in table 1500, the link may be characterized by the lowest assigned score, 13, (i.e., assuming the other applied TxEQs for lanes 2-14 which are not shown yielded a score greater than or equal to 13) of the tested TxEQs.

Advantageously, the algorithm described in the present disclosure may perform the link health experiment within 0.5 seconds when three TxEQs are tested per lane of each link so user wait time is minimal. One having ordinary skill in the art may appreciate that the present disclosure is not limited to testing only three TxEQs per lane of each link and that more or less than three TxEQs per lane of each link. For example, a greater number of TxEQs may be tested per lane of each link which may also increase the duration of the link health experiment procedure.

The following examples pertain to further embodiments. Specifics in the examples may be used anywhere in one or more embodiments. For instance, all optional features of the apparatus or system described herein may also be implemented with respect to the method or process described herein.

Example 1

A method, comprising determining a jitter tolerance of a particular lane of a communication link corresponding to each of a plurality of equalization coefficients. The method further comprising determining a particular equalization coefficient of the plurality of equalization coefficients that provides a maximum jitter tolerance. Next, using the particular equalization coefficient for the particular lane of the communication link during operation based on determining the particular equalization coefficient which provides the maximum jitter tolerance.

Example 2

The maximum jitter tolerance of the particular lane is determined by measuring the highest level of jitter the particular lane sustained prior to failing.

Example 3

Assigning a score for each measurement of the highest level of jitter for the particular lane per equalization coefficient.

Example 4

Assigning a score for each measurement of the highest level of jitter tolerance for each lane of the communication link per equalization coefficient.

Example 5

Failing includes an inability to maintain a bit error rate threshold across the particular lane according to a communication protocol.

Example 6

Determining a maximum jitter tolerance for each lane of the communication link.

Example 7

The plurality of equalization coefficients includes three equalization coefficients.

Example 8

The communication link is a Peripheral Component Interconnect Express (PCIe) bus interface link.

Example 9

The particular equalization coefficient includes retraining the communication link to the particular equalization coefficient for the particular lane of the communication link.

Example 10

The communication link has at least 16 lanes.

Example 11

A system, comprising a first component coupled to a second component wherein the first component and the second component are to communicate along a communication link. Further, the first and second components are to determine a particular equalization coefficient of a plurality of equalization coefficients that is to yield a maximum jitter tolerance for a particular lane in response to jitter induced on the particular lane.

Example 12

The first component is a root complex device and the second component is an endpoint device.

Example 13

The second component includes a video card.

Example 14

The equalization coefficient is applied to the particular lane during an operational phase in response to determining the particular equalization coefficient that is to yield the maximum jitter tolerance for the particular lane.

Example 15

The plurality of equalization coefficients includes three transmitter equalization coefficients.

Example 16

Each lane is trained according to a communication protocol to the particular equalization coefficient which the second component yielded the maximum jitter tolerance.

Example 17

The first communication link includes a PCIe link.

Example 18

An apparatus, comprising: coefficient logic to apply a plurality of equalization coefficients to a lane of a serial, point-to-point link during a training stage. Further, jitter logic to induce jitter on the lane for each of the plurality of equalization coefficients to be applied to the lane by the coefficient logic during the training stage. In addition, the coefficient logic is to apply a particular equalization coefficient of the plurality of equalization coefficients to the lane during an operational stage in response to the particular equalization coefficient to be determined to provide a maximum jitter tolerance for the lane during the training stage.

Example 19

The jitter logic is to effect various jitter signals to induce varying levels of jitter on to the lane.

Example 20

The jitter signal aligns in phase with an intersymbol interference event in the at least one lane.

Example 21

The jitter induced by the device has a duty cycle of approximately 5 percent.

Example 22

The jitter logic is a component of a phase modulator.

Example 23

The jitter logic is to induce jitter into the lane to cause the lane to fail.

Example 24

A computer readable medium including code, when executed, to cause a machine to: determine a jitter tolerance for each equalization coefficient of a plurality of equalization coefficients for a lane of a high speed serial link, wherein the jitter tolerance for each equalization coefficient for the lane is based on a level of jitter induced on the lane to detect a number of errors on the lane; determine a particular equalization coefficient of the plurality of equalization coefficients that provides a maximum jitter tolerance based on the determining the jitter tolerance for each equalization coefficient; and using the particular equalization coefficient for the lane during operation based on the determining the particular equalization coefficient which provides the maximum jitter tolerance.

Example 25

The computer readable medium of claim 24, wherein a wait time is observed between inducing jitter and detecting the number of errors which occurs as a result of the jitter induced on the lane.

Example 26

The wait time is between 0.1 ms and 5 ms.

Example 27

Determining the maximum jitter tolerance is repeated a number of iterations until a convergence point is achieved.

Example 28

The maximum jitter tolerance of the particular lane is determined by measuring the highest level of jitter the particular lane sustained prior to failing.

Example 29

The initial level of jitter to induce on the lane is based on a maximum jitter level of a previously trained lane of the link.

Example 30

In addition, code to assign a score for each measurement of the maximum jitter tolerance for each lane of the communication link per equalization coefficient.

Example 31

Machine-readable storage including machine-readable instructions, when executed, to implement a method or realize an apparatus as claimed in any preceding claim.

Example 32

An apparatus comprising means to perform a method as claimed in any preceding claim.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still "configured to" perform a designated task if it is designed, coupled, and/or interconnected to perform said designated task. As a purely illustrative example, a logic gate may provide a 0 or a 1 during operation. But a logic gate "configured to" provide an enable signal to a clock does not include every potential logic gate that may provide a 1 or 0. Instead, the logic gate is one coupled in some manner that during operation the 1 or 0 output is to enable the clock. Note once again that use of the term "configured to" does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases "capable of/to," and or "operable to," in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etcetera, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etcetera). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method, comprising:
    determining a jitter tolerance of a particular lane of a communication link corresponding to each of a plurality of equalization coefficients;
    wherein if at least one lane has been trained, an initial level of jitter is induced on the particular lane based on a maximum jitter tolerance of a previously trained lane of the link;
    determining one of the plurality of equalization coefficients that provides the greatest maximum jitter tolerance of the particular lane; and
    employing the one equalization coefficient that provides the greatest maximum jitter tolerance during normal operation.

2. The method of claim 1, wherein the maximum jitter tolerance of the particular lane is determined by measuring the highest level of jitter the particular lane sustained prior to failing.

3. The method of claim 2, further comprising assigning a score for each measurement of the highest level of jitter for the particular lane per equalization coefficient.

4. The method of claim 2 further comprising assigning a score for each measurement of the highest level of jitter tolerance for each lane of the communication link per equalization coefficient.

5. The method of claim 2, wherein failing includes an inability to maintain a bit error rate threshold across the particular lane according to a communication protocol.

6. The method of claim 1, further comprising determining a maximum jitter tolerance for each lane of the communication link.

7. The method of claim 1, wherein the plurality of equalization coefficients includes three equalization coefficients.

8. The method of claim 1, wherein the communication link is a Peripheral Component Interconnect Express (PCIe) bus interface link.

9. The method of claim 1, wherein using the particular equalization coefficient includes retraining the communication link to the particular equalization coefficient for the particular lane of the communication link.

10. The method of claim 1, wherein the communication link has at least 16 lanes.

11. A system, comprising:
    a first component coupled to a second component wherein the first component and the second component are to communicate along a communication link; and
    wherein the first and second components are to determine a particular equalization coefficient of a plurality of equalization coefficients that is to yield a maximum jitter tolerance for a particular lane in response to jitter induced on the particular lane,
    wherein each lane is trained according to a communication protocol to the particular equalization coefficient which the second component yielded the maximum jitter tolerance.

12. The system of claim 11, wherein the first component is a root complex device and the second component is an endpoint device.

13. The system of claim 11, wherein the second component includes a video card.

14. The system of claim 11, wherein the equalization coefficient is applied to the particular lane during an operational phase in response to determining the particular equalization coefficient that is to yield the maximum jitter tolerance for the particular lane.

15. The system of claim 11, wherein the plurality of equalization coefficients includes three transmitter equalization coefficients.

16. The system of claim 11, wherein the first communication link includes a PCIe link.

17. An apparatus, comprising:
coefficient logic to apply a plurality of equalization coefficients to a lane of a serial, point-to-point link during a training stage;
detect logic to detect a number of errors associated with the lane;
wherein a wait time is observed between inducing jitter and detecting the number of errors,
wherein the wait time is between 0.1 ms and 5 ms; and
jitter logic to induce jitter on the lane for each of the plurality of equalization coefficients to be applied to the lane by the coefficient logic during the training stage,
wherein the coefficient logic is to apply a particular equalization coefficient of the plurality of equalization coefficients to the lane during an operational stage in response to the particular equalization coefficient to be determined to provide a maximum jitter tolerance for the lane during the training stage.

18. The apparatus of claim 17, wherein the jitter logic is to effect various jitter signals to induce varying levels of jitter on to the lane.

19. The apparatus of claim 17, wherein the jitter signal aligns in phase with an inter-symbol interference event in the at least one lane.

20. The apparatus of claim 17, wherein the jitter induced by the device has a duty cycle of approximately 5 percent.

21. The apparatus of claim 17, wherein the jitter logic is a component of a phase modulator.

22. The apparatus of claim 17, wherein the jitter logic is to induce jitter onto the lane to cause the lane to fail.

23. A non-transitory computer readable medium including code, when executed, to cause a machine to:
determine a jitter tolerance for each equalization coefficient of a plurality of equalization coefficients for a lane of a high speed serial link, wherein the jitter tolerance for each equalization coefficient for the lane is based on a level of jitter induced on the lane to detect a number of errors on the lane;
determine one of the plurality of equalization coefficients that provides a maximum jitter tolerance based on the determining the jitter tolerance for each equalization coefficient; and
employ the particular equalization coefficient for the lane during operation based on the determining the particular equalization coefficient which provides the greatest maximum jitter tolerance,
wherein if at least one lane has been trained, an initial level of jitter is induced on the lane based on a maximum jitter level of a previously trained lane of the link.

24. The non-transitory computer readable medium of claim 23, wherein a wait time is observed between inducing jitter and detecting the number of errors which occurs as a result of the jitter induced onto the lane.

25. The non-transitory computer readable medium of claim 24, wherein the wait time is between 0.1 ms and 5 ms.

26. The non-transitory computer readable medium of claim 23, wherein the determining the maximum jitter tolerance is repeated a number of iterations until a convergence point is achieved.

27. The non-transitory computer readable medium of claim 23, wherein the maximum jitter tolerance of the particular lane is determined by measuring the highest level of jitter the particular lane sustained prior to failing.

28. The non-transitory computer readable medium of claim 23 further including code to assign a score for each measurement of the maximum jitter tolerance for each lane of the communication link per equalization coefficient.

* * * * *